United States Patent [19]

Kobayashi et al.

[11] Patent Number: 4,881,429
[45] Date of Patent: Nov. 21, 1989

[54] SHIFT CONTROL ARRANGEMENT FOR AUTOMATIC TRANSMISSION

[75] Inventors: Masayuki Kobayashi, Isehara; Masahiro Takiguchi, Fuji, both of Japan

[73] Assignees: Nissan Motor Co., Ltd., Yokohama; Japan Automatic Transmission Co., Ltd., Fuji, both of Japan

[21] Appl. No.: 188,509

[22] Filed: Apr. 29, 1988

[51] Int. Cl.$^4$ .................. B60K 41/18; B60K 41/16
[52] U.S. Cl. ................................ 74/867; 74/866; 364/424.1
[58] Field of Search ............ 74/752 D, 752 C, 866, 74/867; 364/424.1

[56] References Cited

U.S. PATENT DOCUMENTS

| | | | |
|---|---|---|---|
| 3,684,066 | 8/1972 | Kubo et al. | 74/866 X |
| 4,502,354 | 3/1985 | Suzuki et al. | 74/866 |
| 4,667,540 | 5/1987 | Yagi | 74/866 |
| 4,680,992 | 7/1987 | Hayasaki et al. | 74/866 X |
| 4,715,145 | 12/1987 | Takeda et al. | 74/866 X |
| 4,722,247 | 2/1988 | Shindo et al. | 74/867 X |
| 4,730,521 | 3/1988 | Hayasaki et al. | 74/867 |
| 4,744,031 | 5/1988 | Takeda et al. | 74/866 X |
| 4,791,568 | 12/1988 | Hiramatsu et al. | 364/424.1 |
| 4,807,132 | 2/1989 | Arai et al. | 364/424.1 |
| 4,807,496 | 2/1989 | Hayasaki et al. | 74/766 |
| 4,819,163 | 4/1989 | Shimizu et al. | 364/424.1 |

FOREIGN PATENT DOCUMENTS

| | | | |
|---|---|---|---|
| 0033911 | 3/1980 | Japan | 74/752 C |
| 0151652 | 8/1984 | Japan | 74/752 C |
| 0124343 | 6/1987 | Japan | 74/866 |
| 2031533 | 4/1980 | United Kingdom | 74/752 C |

Primary Examiner—Leslie A. Braun
Assistant Examiner—William Gehris
Attorney, Agent, or Firm—Foley & Lardner, Schwartz, Jeffery, Schwaab, Mack, Blumenthal & Evans

[57] ABSTRACT

In order to obviate a knocking noise in a one-way clutch during upshifting under low engine load, a hydraulically controlled clutch, which is arranged in parallel therewith, is momentary supplied with line pressure.

7 Claims, 5 Drawing Sheets

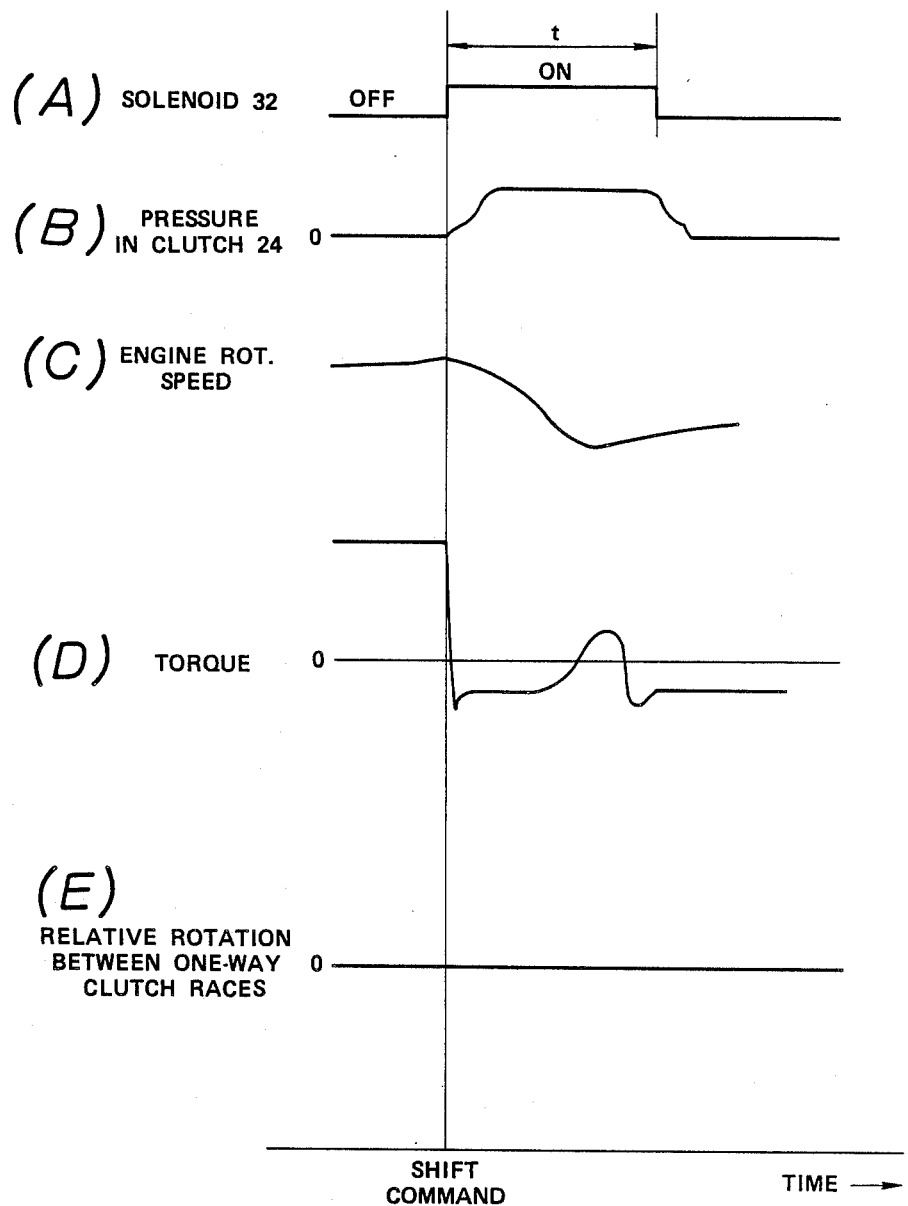

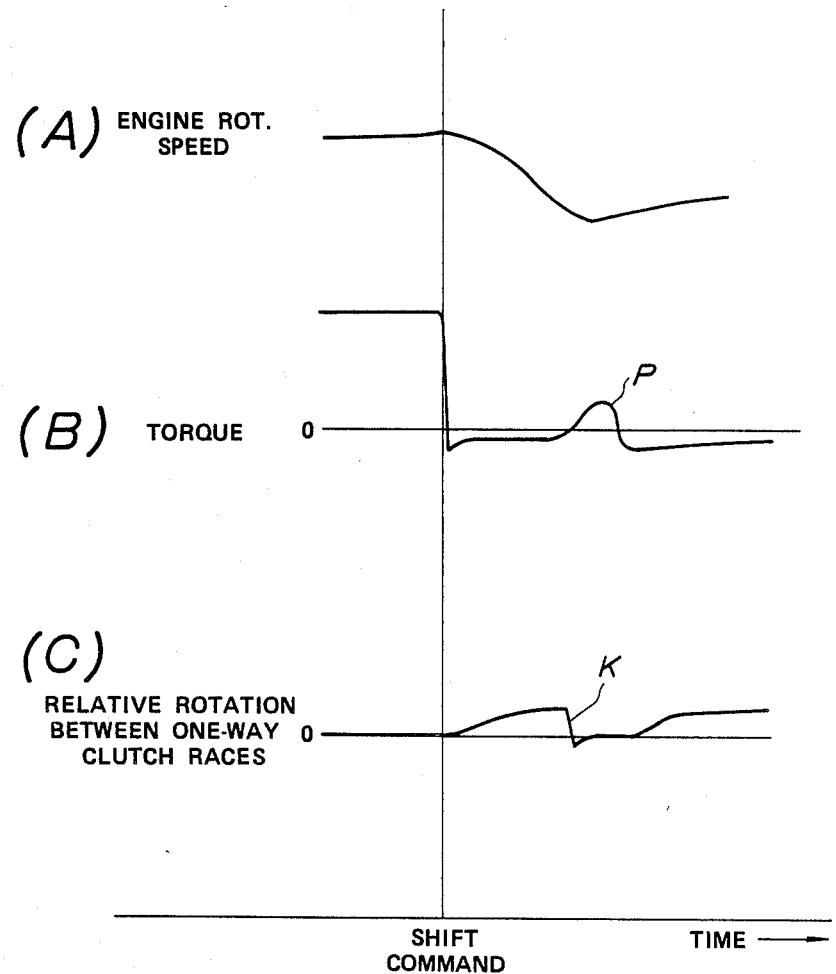

SHIFT CONTROL ARRANGEMENT FOR AUTOMATIC TRANSMISSION

BACKGROUND OF THE INVENTION

1. Field of the Invention

The present invention relates generally to an automatic transmission and more specifically to a control system for such a device.

2. Description of the Prior Art

U.S. Pat. No. 4,730,521 issued on Mar. 15, 1988 discloses an automatic automotive transmission which can produce four forward speeds and one reverse.

In this transmission a one-way clutch and a forward clutch are directly aligned and an overrunning clutch is arranged in parallel with the one way clutch and the forward clutch. The forward clutch is engaged in all forward gears (viz., engaged in first, second, third and fourth gears). The one-way clutch is engaged during first, second and third forward speeds and un-engaged during fourth speed.

When the transmission is conditioned for D range the overrunning clutch is not engaged however it is engaged when engine braking is required and the transmission is selectively conditioned to produce one of first, second and third gears. Accordingly, when the transmission is set in D range rotational energy is transmitted via the forward and one-way clutches. With this arrangement the shift timing between third and fourth gears is easily adjusted.

However, this arrangement has suffered from the drawback that, especially when the engine throttle valve is fully closed and an upshift such as a 1-2. 1-3 or a 2-3 upshift takes place, an undesirable knocking noise is produced in the one-way clutch.

The reason for this is that, when these shifts take place the engine rotational speed is reducing and at the same time the torque applied to the one-way clutch disappears. This momentarily permits the one-way clutch to assume an un-engaged condition. Following this the engine speed decreases until it matches the newly established transmission conditions. However, at this time torque is momentarily applied to the one-way clutch (see peak P in FIG. 5B) whereafter a coasting condition is established. This induces the one-way clutch to again assume an unengaged state.

As there is a small amount of relative movement possible between the races of the one-way clutch, the sudden re-application of torque to the device causes a sudden amount of movement, such as shown at K in FIG. 5C, and the knocking produced when the two elements engage at the end of the movement.

Apart from producing undesirable noise, this also deteriorates the shift feeling produced by the transmission and additionally detracts from the operational characteristics of the arrangement.

SUMMARY OF THE INVENTION

It is an object of the present invention to provide a tranmission arrangement wherein upshifts of the nature described hereinabove can made without generation of noise and loss of shift feeling.

In brief, the invention provides an arrangement wherein, during upshifting under low engine load, a hydraulically controlled clutch, which is arranged in parallel with the one-way unit in which the noise is generated, is momentary supplied with line pressure.

More specifically, the present invention is deemed to take the form of a transmission which features: a one-way clutch; a first clutch, the first clutch being directly connected with the one way clutch; a second clutch, the second clutch being connected in parallel with the first clutch and the one-way clutch; a solenoid valve, the solenoid valve having first and second operative states, the solenoid valve being arranged to induce the second clutch to engage when in the first operative state; means for discerning a transmission upshift operation; means for detecting the engine throttle valve assuming a closed position; and solenoid energization means responsive to the upshift discerning means and the closed throttle valve detection means, for conditioning the solenoid to assume the first stage for a predetermined time.

BRIEF DESCRIPTION OF THE DRAWINGS

FIG. 4 is a timing chart showing the control provided by the instant embodiment; and FIG. 5 is a timing chart similar to that shown in FIG. 4 but which demonstrates the problem which occurs in the prior art disclosed hereinbefore.

DETAILED DESCRIPTION OF THE PREFERRED EMBODIMENT

Figure 1:
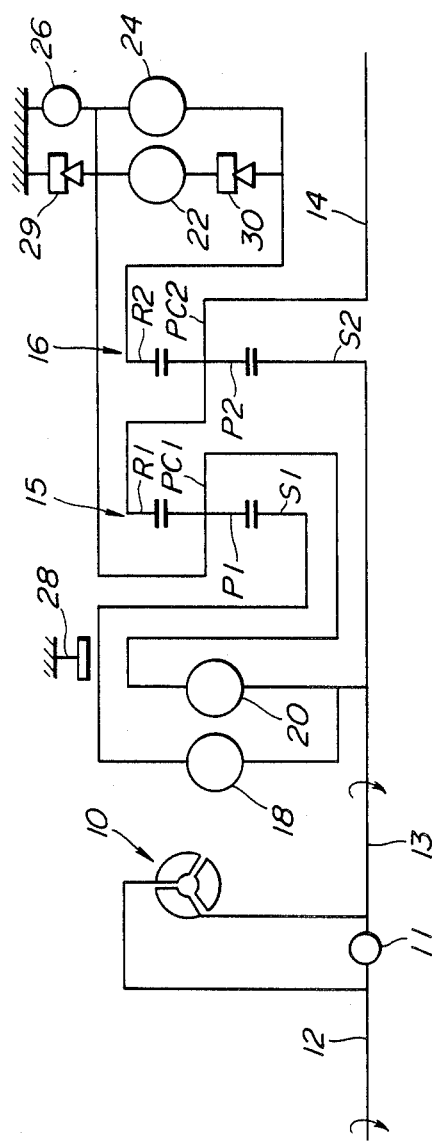
FIG. 1 shows in schematic form a gear train of a transmission to which the present invention is applied.

FIG. 1 shows a gear train of a transmission to which the present invention is applied. In this device a torque converter 10 and lock-up clutch 11 are arranged to receive engine torque through an engine output shaft 12 and to transmit this rotational energy to a transmission input shaft 13. As the construction and operation of such units is well known a description of the same will be omitted for brevity.

A final drive unit (not shown) is operatively connected to the transmission output shaft 14.

Operatively disposed between the input and output shafts 13 and 14 are a first planetary gear unit 15, a second planetary gear unit 16, a reverse clutch 18, a high clutch 20, a forward clutch 22, an overrunning clutch 24, a low and reverse brake 26, a band brake 28, a low one-way clutch 29 and a forward one-way cluch 30.

The first planetary gear unit 15 includes a sun gear S1, an internally toothed ring gear R1, a pinion carrier PC1 and pinion gears P1 operatively mounted on the carrier in a manner to establish a connection between the ring and sun gears R1, S1.

The second planetary gear unit similarly includes a sun gear S2, an internally toothed ring gear R2, a pinion carrier PC2 and pinion gears P2.

The carrier PC1 of the first unit is connected to the input shaft 13 by way of high clutch 20. Sun gear S1 is connected with the input shaft 13 by way of the reverse clutch 18, and the carrier PC1 is connected with the forward clutch 22 and the forward one-way clutch 30 which is directly connected thereto.

Ring gear R2 of the second planetary gear unit is connected with the forward clutch 22 by way of the forward one-way clutch 30 and with the overrunning clutch 24 which is arranged in parallel with elements 22 and 30. The sun gear S2 of the second gear unit 16 is directly and continuously connected with the input shaft 13 while the ring gear R1 and the carrier PC2 are in constant direct connection with the output shaft 14.

The low and reverse brake 26 is arranged to render the carrier PC1 of the first planetary gear set 15 stationary when engaged, while the band brake 28 is arranged to prevent rotation of sun gear S1 of the first planetary gear set 15 when applied.

The low one-way clutch 29 is arranged to permit the carrier PC1 to rotate in the same direction as the input shaft 12 and prevent rotation in the reverse direction.

By operating the above mentioned friction elements—viz., clutches 18, 20, and 24, and brakes 26 and 28 in the manner shown in table 1 (see page 11 of the instant specification) it is possible to produce a plurality of forward and one reverse gear ratios. In this table 0 denotes the application of an element while alpha 1 and alpha 2 respectively denote the ratio of the teeth on the ring gears R1, R2 and sun gears S1 and S2. The gear ratio denotes the rotational speed ratio between the input and output gears 13, 14.

Figure 2:
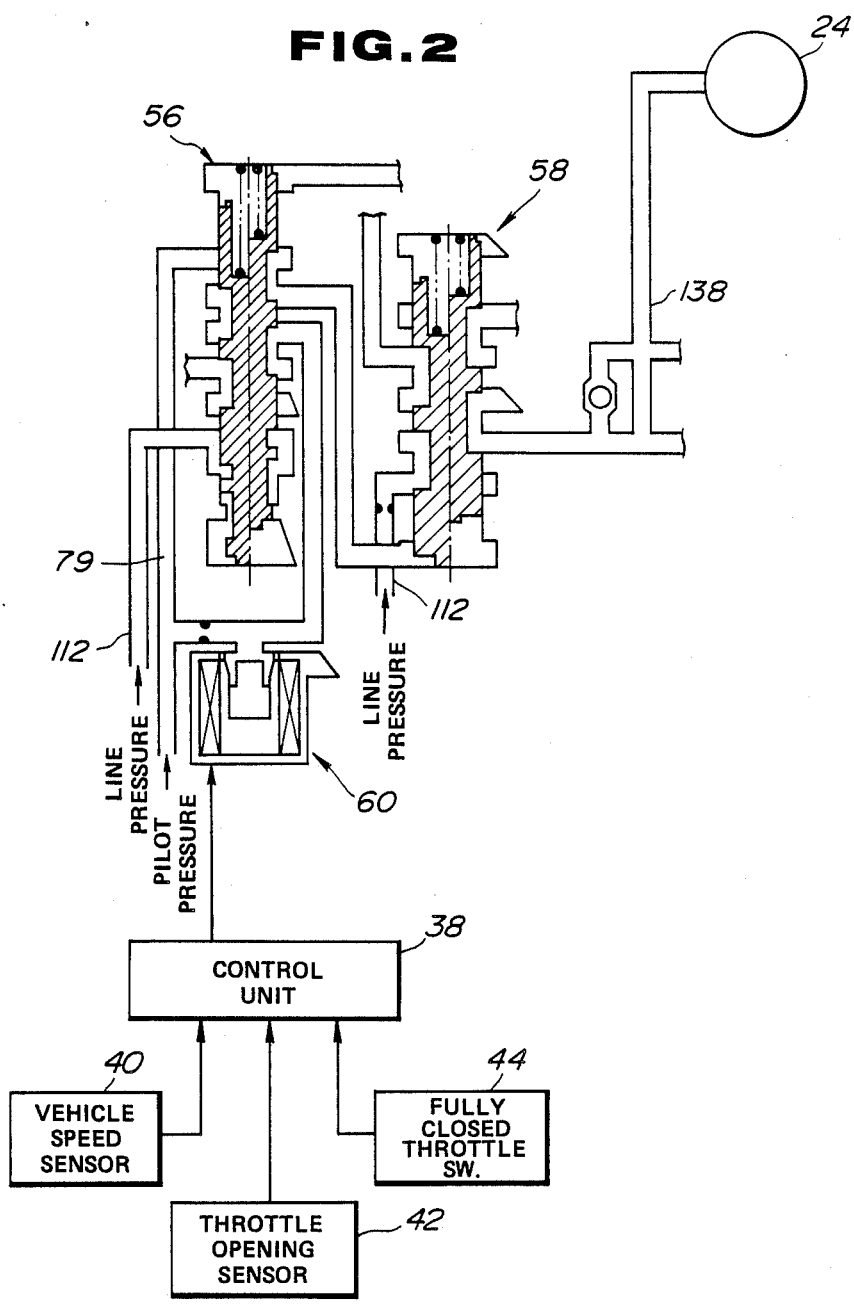
FIG. 2 is a sectional view showing a valve and control arrangement which forms a vital part of the invention.

FIG. 2 shows in detail the arrangement of the overrunning clutch 24 and an engagement control arrangement which is associated therewith in accordance with the present invention. The control arrangement includes a solenoid 60 which is arranged with a shuttle valve 56 and an overrunning clutch control valve 58. In this arrangement conduits 112 are connected with a source of line pressure while conduit 79 is supplied a pilot pressure.

The solenoid 60 is arranged to be energized and de-energized in a manner which modifies the supply of pilot pressure to the shuttle valve 56. In accordance with the position of the spool of the shuttle valve 56 the supply of pilot pressure to the overrunning clutch control valve 58 is controlled. This control in turn controls the supply of line pressure to the overrunning clutch 24 via conduit 138.

Solenoid 60 is operatively connected with a control unit 38 which in this instance includes a microprocessor. Although not specifically illustrated, this processor includes at least one RAM, ROM, CPU and I/O interface. The control unit is arranged to receive data inputs from a vehicle speed sensor 40, a throttle opening sensor 42 and a fully closed throttle position sensing switch 44.

As the operation of the clutches other than the overrunning clutch is not directly related with the operation of the present invention, a complete disclosure of the same will be omitted for brevity. For further details concerning the same, reference can be had to U.S. Pat. No. 4,680,992 issued on July 21, 1987 in the name of Hayasaki et al; U.S. Pat. No. 4,730,521 issued on Mar. 15, 1988 in the name of Hayasaki et al; and U.S. patent application Ser. No. 905,087 filed on Sept. 9, 1986 in the name of Hayasaki (now in condition for allowance). The content of these references is hereby incorporated by reference thereto.

It will be noted that for the ease of reference the same numerals as used in U.S. Pat. No. 4,730,521 in connection with the valves and conduits have been used in the instant specification.

Figure 3:
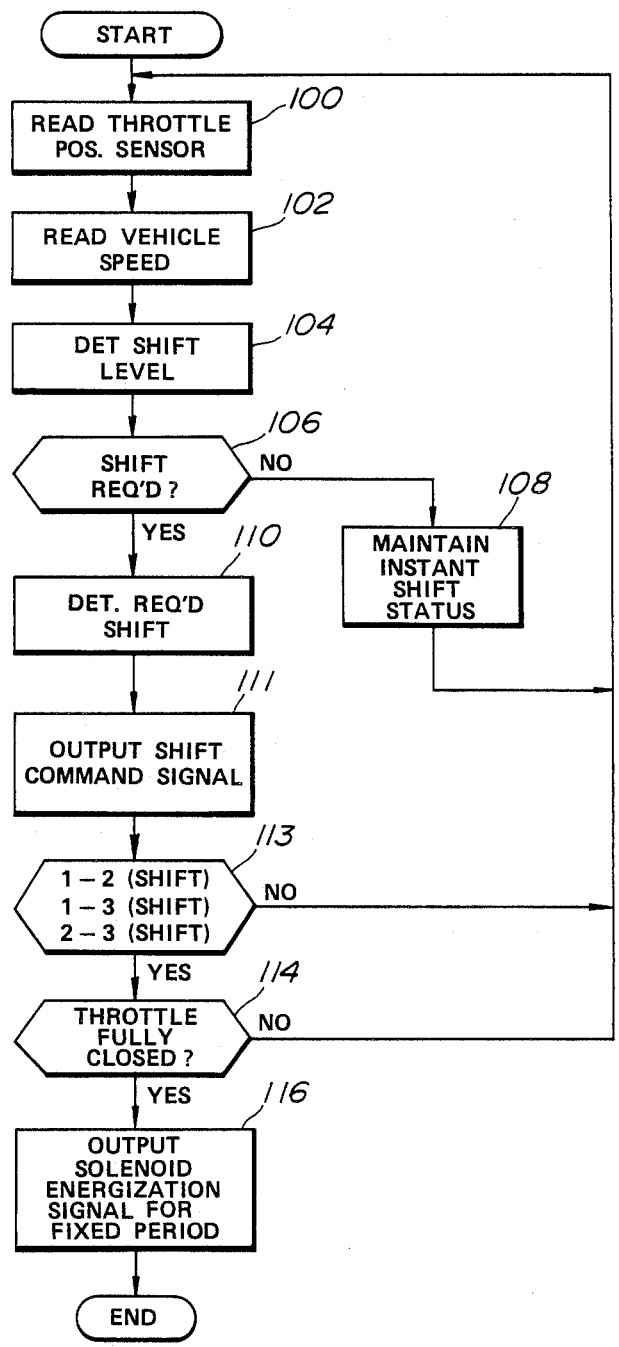
FIG. 3 is a flow chart showing the characterizing steps which are executed in connection with the control of the present invention.

The ROM of the microprocessor contains a control program the nature of which is illustrated in the flow chart shown in FIG. 3. As will be readily appreciated, the first two steps of this routine are such as to sample the output of the throttle position sensor and the vehicle speed sensor and to set these values in RAM ready for further processing.

At step 104 the instant vehicle speed and throttle setting are used to determine the instant shift position from a predetermined prememorized shift pattern.

At step 106 a determination is made as to whether a gear shift is required or not. This is done by comparing the instant shift position with the desired shift position.

This decision can be made by determining the position defined by the instant engine load and vehicle speed values and determining which shift zone the position falls in and the time for which the point has resided in the same. By way of example only, if the point defined by the instant engine load and vehicle speed falls on a shift line, it is within the scope of the present invention to determine that while the point has been at this location for less than a predetermined time, for example 500 ms to one second, that a given shift has not yet been completed. Upon expiry of this time it can be assumed that the shift has actually been completed and that a shift instruction need not be issued.

Alternatively, it is possible to set he various shift commands in a register in a manner which enables the instant shift status to be recognized from the setting of flags indicating the instant solenoid energization status.

For further reference to this facet of transmission control reference may be had to U.S. Pat. No. 4,502,354 issued on Mar. 5, 1985 in the name of Suzuki et al. Although the whole document is hereby incorporated by reference thereto particular attention may be paid to steps 410 and 421 of the flow chart shown in FIG. 12 and the corresponding disclosure given at column 18 line 26 column 19 line 56 which bears relevance to the above mentioned matters.

In the event that the outcome of step 106 is such as to indicate that no shift command need be issued the program flows to step 108 wherein a command which maintains the current shift status is issued.

On the other hand, in the event that a shift is found to be necessary, the appropriate shift is determined in step 110 and in step 111 appropriate commands which induce the shift indicated by the outcome of step 110 are issued.

At step 113 the commands issued in the previous step are screened in a manner to determine if any one of a 1-2, 1-3 or a 2-3 shift has been issued. If the outcome is negative the program returns. However, in the instance that the shift ordered in step 111 is one of the three listed hereinbefore, the program proceeds to step 114 wherein the instant status of the throttle closure detection switch 44 is sampled.

If switch 44 is not closed, indicating that the throttle valve is opened beyond a predetermined angle, the program returns. On the other hand, in the event the switch is closed indicating that the throttle is closed and/or close to closed, the program flows to step 116.

In step 116 a command to energize solenoid 60 for a predetermined time t is issued. The effect of this energization will be discussed hereinafter.

When solenoid 60 is energized overrunning clutch 24 is supplied with hydraulic pressure (line pressure) and thus is engaged in manner wherein it is capable of transmitting rotational energy. Under these conditions the one-way clutch 30 is changed from an un-engaged or free condition to a connected or engaged one and the undesirable knocking noise is prevented.

FIG. 4 is a timing chart showing the ON/OFF timing of the solenoid 60; the hydraulic pressure prevailing in the overrunning clutch 24; engine rotational speed; torque fluctuation; and the relatively rotation between the inner and outer races of the one-way clutch 30, as provided by the present invention.

The engine speed, torque and relative rotation characteristics should be compared with those shown in FIG. 5.

As will be noted when the solenoid is energized during shifting the above mentioned three characteristics are modified in a manner that essentially no relative rotation between the inner and outer races occurs. This of course results in the problem encountered with the prior art being eliminated.

Although, in the instant embodiment, the use of fixed period t has been disclosed, it should be understood that it is within the scope of the present invention to vary the length of this period in accordance with a selected parameter. For example, it is possible to vary the length of time t in accordance with the vehicle speed.

It should be noted that although three sensors have been disclosed it is possible to replace the throttle valve fully closed position sensing switch 44 with a different arrangement if so desired. Merely by way of example, it is possible to monitor the direction and rate at which the throttle valve is closing using the input from the throttle valve position, and upon approaching a near closed position, predict the closure of the same. As a further alternative, a torque sensor which detects the torque inputted to the transmission could also be considered for use in the present invention.

means for discerning a transmission upshift operation;
means for detecting an engine throttle valve assuming a closed position; and
solenoid energization means responsive to said upshift discerning means and said closed throttle valve detection means, for conditioning said solenoid to assume said first state for a predetermined time.

2. A transmission as claimed in claim 1 said transmission including first and second planetary gears sets, said first planetary gear set including:
a first sun gear;
a first ring gear;
a first pinion carrier; and
first pinion gears, said first pinion gears being supported on said firt pinion carrier and arranged to operatively interconnect said first sun gear and said first ring gear;
said second planetary gear set including:
a second sun gear;
a second ring gear;
a second pinion carrier;
second pinion gears, said second pinion gears being supported on said second pinion carrier and arranged to operatively connect said second sun gear with said second ring gear.

3. A transmission as claimed in claim 2 wherein said one-way clutch and said first clutch are arranged between said first carrier and said second ring gear and said second clutch is arranged to provide a second parallel connection between said first carrier and said second ring gear when engaged.

TABLE 1

|  | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|
| D RANGE | | | | | | | | | | |
| 1st |  |  | o |  |  |  | o | o | $\frac{1 + \alpha_2}{\alpha_2}$ | 3.027 |
| 2nd |  |  | o |  | o |  | o |  | $\frac{\alpha_1 + \alpha_2 + \alpha_1\alpha_2}{\alpha_2(1 + \alpha_1)}$ | 1.619 |
| 3rd |  | o | o |  |  |  | o |  | 1 | 1.000 |
| 4th |  | o | (o) |  | o |  |  |  | $\frac{1}{1 + \alpha_1}$ | 0.694 |
| ENGINE BRAKING | | | | | | | | | | |
| 1st |  |  | (o) | o |  | o | (o) | (o) |  |  |
| 2nd |  |  | (o) | o | o |  | (o) |  |  |  |
| 3rd |  | o | (o) | o |  |  | (o) |  |  |  |
| 4th |  | o | (o) |  | o |  |  |  |  |  |
| REVERSE | o |  |  |  |  | o |  |  | $-\frac{1}{\alpha_1}$ | −2.272 |

(Bracketed elements unrelated to power transmission path)

What is claimed is:
1. In a transmission
a one-way clutch;
a first clutch, said first clutch being directly connected with said one way clutch;
a second clutch, said second clutch being connected in parallel with said first clutch and said one-way clutch;
a solenoid valve, said solenoid valve having first and second operative states, said solenoid valve being arranged to induce said second clutch to engage when in said first operative state;

4. A transmission as claimed in claim 3 further comprising:
an input shaft;
an output shaft;
said first carrier being connected to said input shaft by way of a third clutch;
said first sun gear being connected to said input shaft by way of a fourth clutch;
said second ring gear being continuously connected with said input shaft; and
said first ring gear and said second carrier being constantly connected with said output shaft.

5. A transmission as claimed in claim 4 further comprising:
   a first brake, said first brake being arranged to render said first carrier stationary when engaged;
   a second brake, said second brake being arranged to prevent rotation of said first sun gear when applied;
   a second one-way clutch, said second one-way clutch being arranged to permit said first carrier to rotate in the same direction as said input shaft 12 and prevent rotation in the reverse direction.

6. A transmission as claimed in claim 1 further comprising:
   a source of line pressure;
   a source of pilot pressure;
   an overrunning clutch control valve;
   a shuttle valve, said shuttle valve being fluidly communicated with said source of pilot pressure, said shuttle valve being arranged to control the supply of pilot pressure to said overrunning clutch control valve, said shuttle valve being operatively connected with said solenoid solenoid valve in a manner wherein when said solenoid valve is conditioned to assume said first state said shuttle valve modifies the supply of pilot pressure to said overrunning clutch control valve and induces line pressure to be supplied to said second clutch via said overrunning clutch control valve;
   said overrunning clutch control valve being operatively interposed between said second clutch and said shuttle valve.

7. In a transmission which is associated with an engine having a throttle valve;
   a one-way clutch;
   a first friction element, said first friction element being directly connected with said one-way clutch;
   a second friction element, said second friction element being connected in parallel with said first friction element and said one-way clutch;
   a solenoid valve, said solenoid valve having first and second states, said solenoid being arranged to induce said second friction element to engage when in said first stage;
   a first sensor arrangement for discerning the transmission undergoing an upshift operation and producing a signal indicative of the same;
   a second sensor arrangement for detecting an engine throttle valve assuming a fully closed position and producing a signal indicative of the same; and
   means responsive to said first and second sensor arrangements for detecting the condition wherein the transmission undergoes an upshift while said throttle valve is in a fully closed position, and for inducing said solenoid valve to assume said first state continuously for a preselected period of time.

* * * * *